(12) United States Patent
Herbeck et al.

(10) Patent No.: US 6,626,017 B2
(45) Date of Patent: Sep. 30, 2003

(54) LOCKING MECHANISM FOR AIR HANDLER (AHU) CABINET

(75) Inventors: Christian C. Herbeck, Manchester, TN (US); Michael W. Austin, McMinnville, TN (US); Walker A. Johnson, Jr., Tullahoma, TN (US); Timothy E. Ruhl, Manchester, TN (US); Peter J. Hoch, McMinnville, TN (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/904,673

(22) Filed: Jul. 13, 2001

(65) Prior Publication Data

US 2003/0011192 A1 Jan. 16, 2003

(51) Int. Cl.$^7$ ............................................. B65D 55/14
(52) U.S. Cl. .................. 70/63; 52/127.9; 52/309.4; 52/582.2; 312/265.5; 292/111; 292/218; 292/240; 138/147; 285/80
(58) Field of Search .................. 52/582.2, 127.5–127.9; 403/321, 322.1; 70/63, 84, 78, 81; 292/240–242, 95, 98, 101, 194, 111, 202, 214, 217, 218, 226, 228, 114; 285/80; 312/265.5, 1; 138/147, 149

(56) References Cited

U.S. PATENT DOCUMENTS

| | | | | |
|---|---|---|---|---|
| 210,198 A | * | 11/1878 | Georg ........................ 285/80 X |
| 2,180,177 A | | 11/1939 | Ternstrom ........................ 20/69 |
| 2,591,531 A | * | 4/1952 | Fishback .................... 285/80 X |
| 2,643,139 A | * | 6/1953 | Hamilton .................... 285/80 X |
| 2,647,287 A | * | 8/1953 | Jones ........................ 292/98 X |
| 3,327,447 A | * | 6/1967 | Nissley ........................ 52/582.2 |
| 3,353,314 A | * | 11/1967 | Melcher ...................... 52/127.9 |
| 3,400,958 A | * | 9/1968 | Haimes et al. ............. 52/127.9 |
| 3,421,459 A | * | 1/1969 | Sherwood ................... 52/127.9 |
| 3,439,942 A | * | 4/1969 | Moore et al. ............. 285/80 X |
| 3,472,545 A | * | 10/1969 | Berkowitz .................... 292/111 |
| 3,565,469 A | * | 2/1971 | Zwart ............................ 52/584 |
| 3,567,260 A | * | 3/1971 | Norris ...................... 52/127.11 |
| 3,661,410 A | * | 5/1972 | Larson et al. .......... 292/111 X |
| 3,671,006 A | * | 6/1972 | Berkowitz ................. 249/97 X |
| 3,784,240 A | * | 1/1974 | Berkowitz .................... 292/111 |
| 3,838,579 A | | 10/1974 | Ballard .......................... 62/262 |
| 4,076,289 A | * | 2/1978 | Follows et al. .............. 292/226 |
| 4,208,068 A | * | 6/1980 | Hauber ........................ 292/126 |

(List continued on next page.)

FOREIGN PATENT DOCUMENTS

| | | |
|---|---|---|
| DE | 1917949 | 10/1970 |
| DE | 1778864 | 10/1971 |
| DE | 4422971 A1 | 1/1994 |
| EP | 0038015 A2 | 10/1981 |
| GB | 1127308 | 9/1968 |
| NL | 1014208 | 7/2001 |
| WO | 01/50068 A1 | 7/2001 |

*Primary Examiner*—Suzanne Dino Barrett
(74) *Attorney, Agent, or Firm*—Wall Marjama & Bilinski LLP

(57) ABSTRACT

A locking mechanism for an air handling duct which includes a plurality of interconnected modules which together made up the duct. The locking mechanism includes a male retainer contained on a frame member of a first module, with the male retainer having a locking arm adapted to be moved from an unlocked position to a locked position. A complementary female retainer is contained on a frame member of a second module, with the female retainer being in the form of an elongated keyway designed to receive and hold the locking arm in a locked position. Means are provided to move the arm from an unlocked position to a locked position when the male and female retainers are in alignment for locking the modules together.

6 Claims, 4 Drawing Sheets

U.S. PATENT DOCUMENTS

| | | | | |
|---|---|---|---|---|
| 4,223,500 A | * | 9/1980 | Clark et al. | 52/309.4 |
| 4,325,229 A | | 4/1982 | DeZurik | 62/262 |
| 4,417,430 A | * | 11/1983 | Loikitz | 292/111 X |
| 4,507,010 A | * | 3/1985 | Fujiya | 403/322.1 |
| 4,512,122 A | * | 4/1985 | Berkowitz | 292/111 X |
| 4,625,477 A | * | 12/1986 | Johnstonbaugh | 52/127.9 |
| 4,641,468 A | * | 2/1987 | Slater | 52/309.4 |
| 4,656,795 A | | 4/1987 | Albrecht et al. | 52/126.6 |
| 4,691,970 A | * | 9/1987 | Neri | 312/257 SK |
| 4,815,887 A | * | 3/1989 | Seiford, Sr. | 292/218 X |
| 5,161,839 A | * | 11/1992 | Piltingsrud et al. | 292/241 |
| 5,212,924 A | * | 5/1993 | Finkelstein | 52/127.9 X |
| 5,452,925 A | * | 9/1995 | Huang | 292/57 |
| 5,870,868 A | | 2/1999 | Kita et al. | 52/309.9 |
| 6,070,919 A | * | 6/2000 | Finkelstein | 292/111 |
| 6,119,427 A | * | 9/2000 | Wyman et al. | 52/584.1 |
| 6,421,972 B1 | * | 7/2002 | Dalphond et al. | 52/309.7 |
| 6,497,256 B1 | * | 12/2002 | Adams et al. | 138/149 |
| 6,530,630 B2 | * | 3/2003 | Herbeck et al. | 312/265.4 |

\* cited by examiner

LOCKING MECHANISM FOR AIR HANDLER (AHU) CABINET

FIELD OF THE INVENTION

This invention relates generally to an air handling unit having ducting which is made by a plurality of interconnected components or modules, and more specifically to a locking mechanism for connecting the modules.

BACKGROUND OF THE INVENTION

Many air handling units found in the prior art are simply fabricated from sheet metal ducts that are brought together in the field to establish an enclosed flow path, through which air is conducted. The sheet metal walls of the ducts readily conduct heat and provide little in the way of a thermal barrier so that energy can flow into or out of the duct work. When the air handling unit is conducting conditioned air, this flow of energy into or out of the duct work can be costly and places an unwanted load on the air conditioning equipment.

In addition, when the air handling unit is installed in an unconditioned space and is carrying cooled air, the outer casing of the unit will "sweat". The moisture so developed will run off the unit onto the floor or equipment contained in the unconditioned space. This, in turn, will lead to a safety hazard for people working in the area and can cause damage to the equipment.

When conventional ducting of this type is installed and/or modified, the assembly or disassembly can be very costly. If this work is done improperly, it can lead to operational problems and warranty issues. This type of conventional ducting utilizes loose fasteners and/or the requirement for internal unit access. Typically the prior art ducting includes stand-off flanges which require separate hardware attachment. The numerous required pieces of hardware increase the probability for mistakes and errors in assembly and modifying ducting in the field, and has been a long standing problem in the field.

SUMMARY OF THE INVENTION

It is therefore an object of the present invention to provide a system for assembling and disassembling air ducts which overcomes the problems of the prior art described above.

It is another object of the present invention to provide an improved ducting system for conducting air along a desired flow path.

It is a further object of the present invention to provide an improved locking mechanism for connecting modules which made up a duct carrying conditioned air.

It is another object of the present invention is to provide an improved locking mechanism for connecting components of a duct system which obviates the need for loose fasteners and associated hardware.

Yet another object of the present invention is to provide a simple external locking system for connecting components of a duct system for an air handling unit.

These and other objects of the present invention are accomplished by an air handling duct system for conducting air along an enclosed path of travel which utilizes a specially designed panel. The panel is used to form attachable sections and includes a rectangular frame made of a material having a high R value. The frame is closed by a top cover and a bottom cover so that a cavity is established within the panel. The cavity is filled with a curable material that sets inside the panel to bond the walls of the frame together and the covers to the frame.

The air handling duct system is made up of a plurality of rectangular sections or modules which are connected to each other by the locking mechanism of the present invention. The locking mechanism is in the form of mechanical latch which includes a male and a female retainer. The male and female retainers are installed separately into two adjoining (section) frame members. The latch is designed to be actuated from the outside of the frame with a common tool such as a hex wrench. The locking action joins the two sections together without the need for loose fasteners or the necessity for access to the inside of the unit.

BRIEF DESCRIPTION OF THE DRAWING

For a better understanding of these and other objects of the invention, reference will be made to the following detailed description of the invention which is to be read in association with the accompanying drawings, wherein.

DETAILED DESCRIPTION OF THE INVENTION

Figure 1:
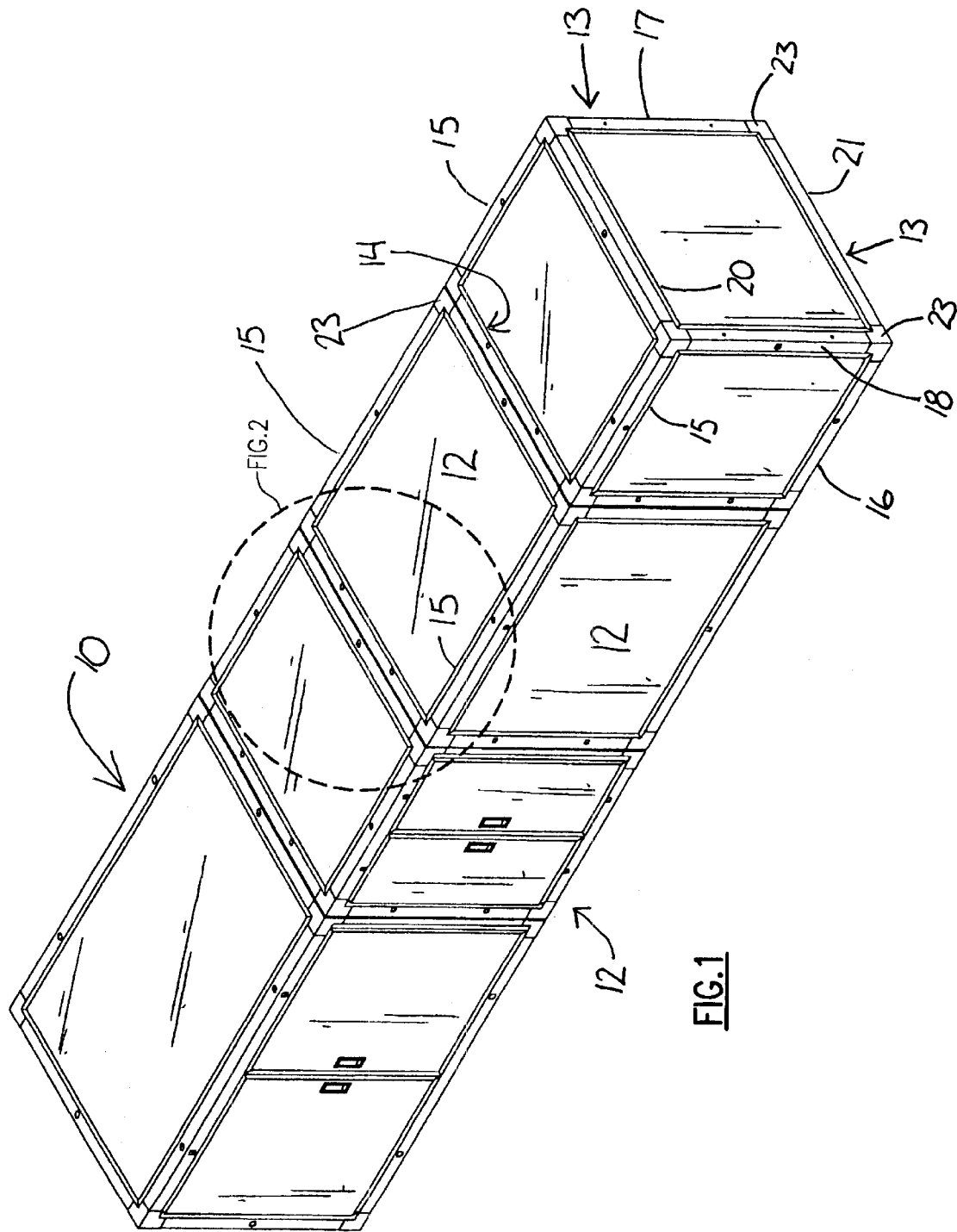
FIG. 1 is a perspective view showing a section of duct work for conducting air along a desired flow path.

Referring to FIG. 1 of the drawings there is illustrated a portion of an air handling unit (AHU), generally referenced 10. The air handling unit is made up of a series of rectangular shaped modules each of which has its own superstructure made up of a pair of end frames 13 and 14 that are connected at the corners by horizontally disposed upper beams 15 and lower beams 16. Each end frame includes two opposed side rails 17 and 18 and an upper rail 20 and a lower rail 21. In assembly, the rails and the beams are retained slidably in corner pieces 23. The rails and the beams in assembly thus establish an open support structure or skeleton with the opening being closed by wall panels 12.

Each wall panel 12 is designed to be placed in the skeleton openings to close desired openings in the sections. Each panel is constructed to have an outer frame which defines an internal cavity 43. The panels are closed by a top cover and a bottom cover and the cavity is filled with a setable polyurethane foam 44 which when cured bond the panels together and forms a thermal barrier that impedes the flow of heat through the panel.

Each panel is sized so that the panel frame can be slipped into an opening in one of the unit sections. A close sliding fit is provided between panel frame walls and the side rails and upper and lower beams that form the receiving opening. Seals are provided to prevent air from passing around the panels as well as through an addition thermal barrier between the inside of the unit and the surrounding ambient.

When a panel has been locked into each of the openings, the designed air duct configuration such as that illustrated in FIG. 1 has been completed.

Figure 2:
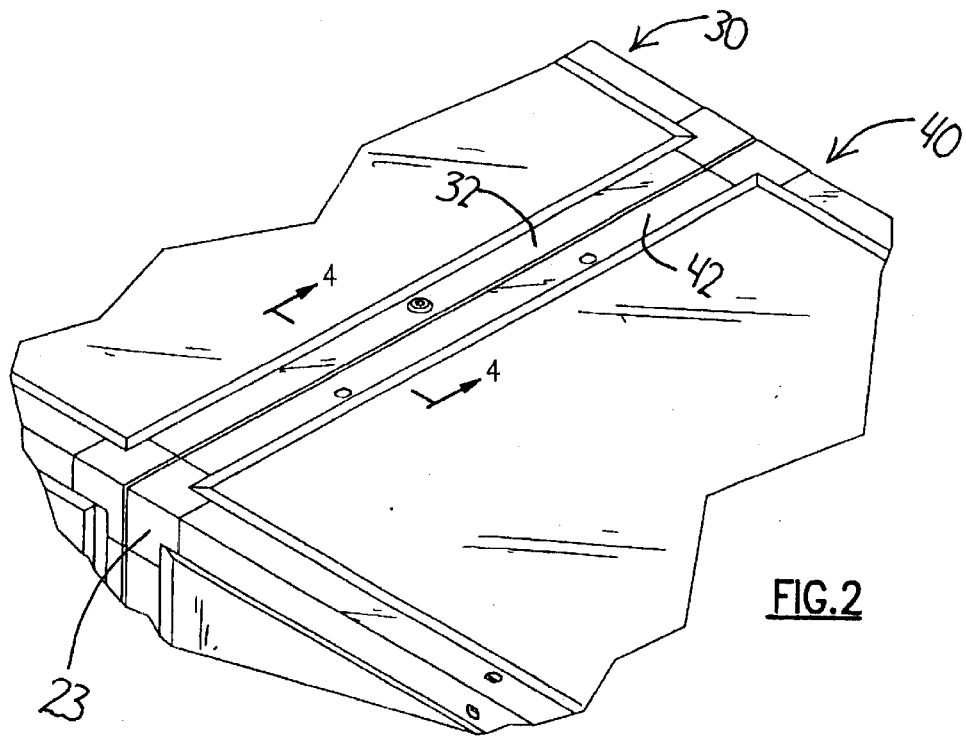
FIG. 2 is a partial perspective view of two modules illustrated in FIG. 1 positioned in interlocking engagement using the latch mechanism of the present invention.
Figure 3:
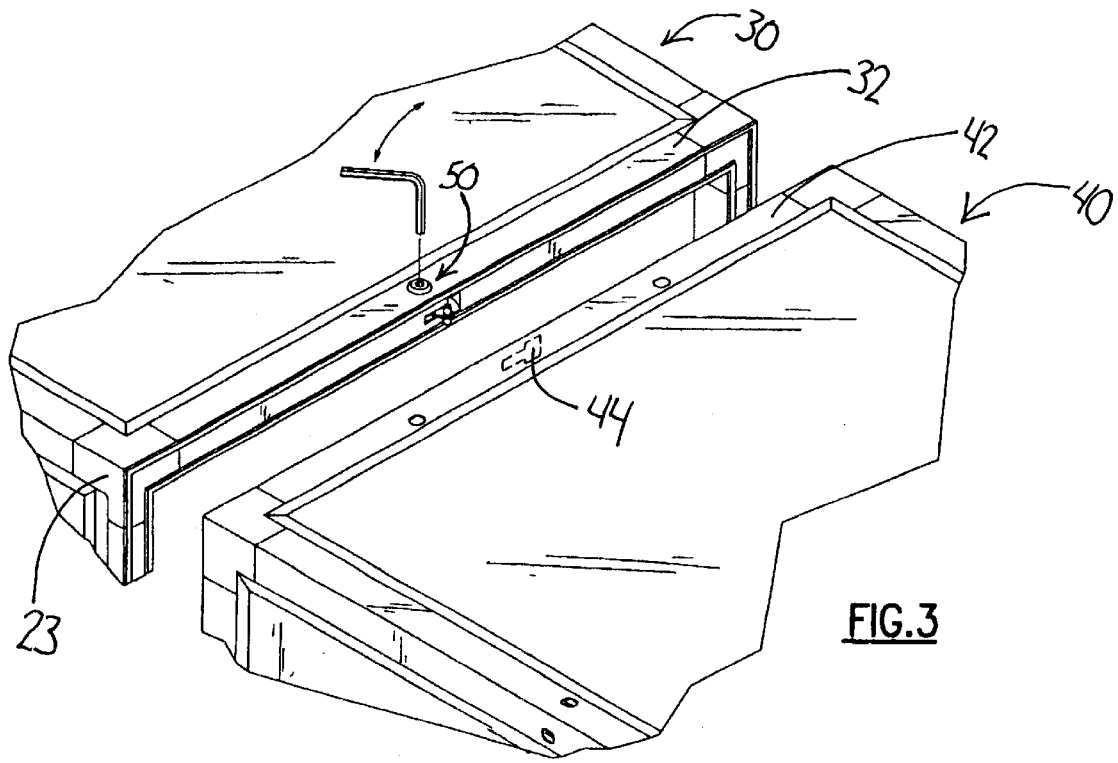
FIG. 3 is a view of the two modules of FIG. 2 in the open or unlocked position showing the relative position of the latch mechanism.

FIG. 2 illustrates a partial sectional view of two modular sections 30 and 40 joined together in locked engagement at their upper rails 32 and 42 to form adjacent sections in the air handling duct. In FIG. 3 the two modules are shown in the open or unlocked position with upper rail 32 containing one of a series of a locking mechanisms 50 used to lock the panels together as will be described in further detail below. The mechanism contains a male retainer which is designed to mate in locking engagement with open keyway 44 located in upper rail 42.

Figure 4:
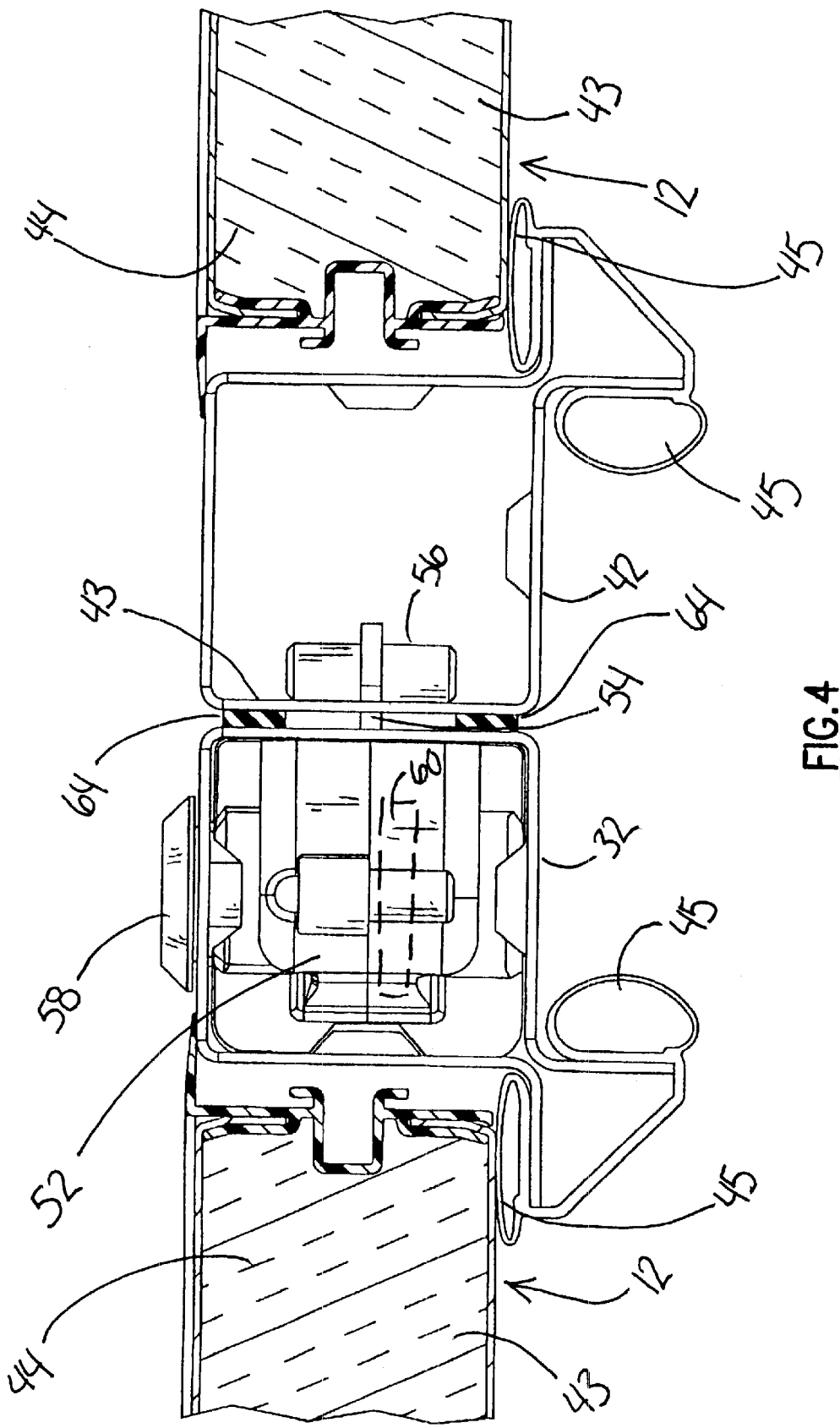
FIG. 4 is an enlarged sectional view of the latching mechanism taken along line 4—4 in FIG. 2.
Figure 6:
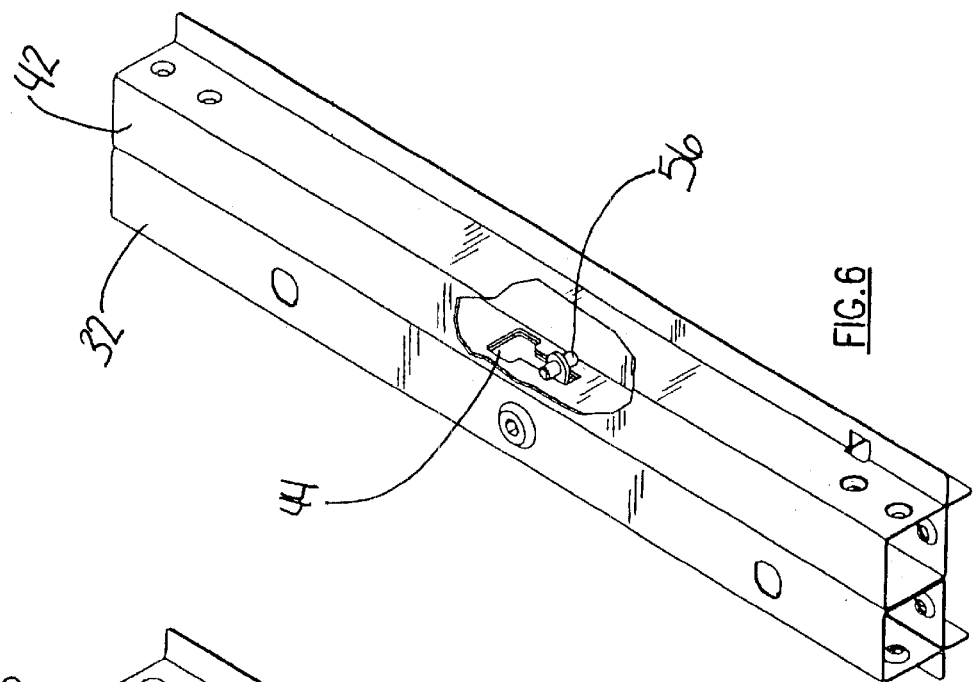
FIG. 6 is a perceptive view of FIG. 5 with a breakaway view of the rails in locking engagement.
Figure 5:
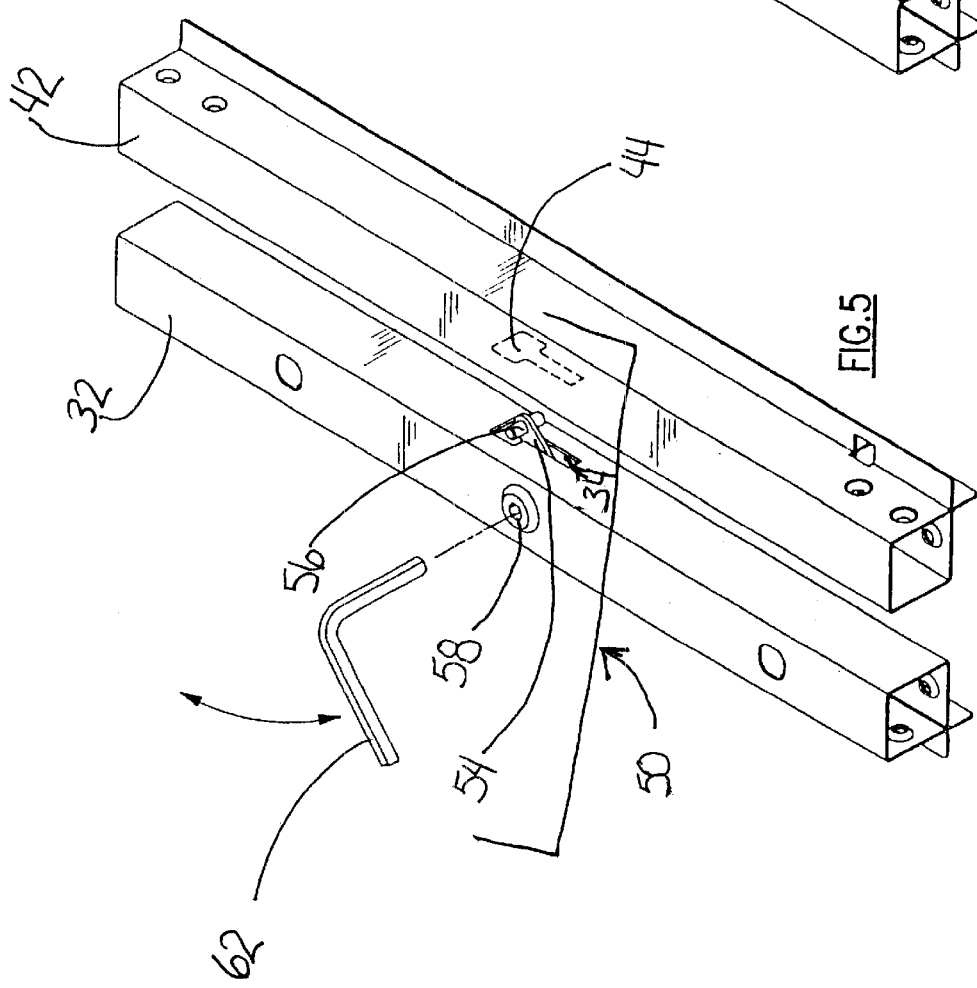
FIG. 5 is an enlarged perspective view of two beam or rail sections of two adjacent modules aligned for locking engagement.

As shown in more detail in FIGS. 4–6, the rails and beams are held in a closed or locked position by a series of locking or latching mechanisms. Each male retainer includes an internal sealed housing 52 that is mounted by a snap fit inside the rails and the beams surrounding each opening (FIG. 4). Preferably, the rails and beams are square metal tubes that are slidably retained in corner pieces 23. Each locking mechanism includes a male retainer which includes a drive arm 54 having a stub shaft latching member 56 at its free end and a fixed rotatable end being attached a camming unit made up of a rotor 58 and a cam 60 that provides prescribed motion to the free end of the drive arm as the arm moves between an unlocked stored position within the housing to a locked position in which the drive arm of the retainer has moved into the keyway 44 of a rail or beam 42 of an adjacent module, and the shaft has been placed in locking engagement against the surface of the beam or rail.

When a pair of modules are properly positioned for locking, the T-shaped keyways of both modules are aligned to provide free travel for the moving stub shaft end of drive arm 54 from keyway 34 of rail 32 into keyway 44 of rail 42. FIG. 5 shows the two keyways in alignment prior to moving the two rails in contact for locking engagement. FIG. 6 shows the rails in locking alignment with the stub shaft 56 positioned in the narrow portion of the keyway 44 of rail 42.

FIG. 4 illustrates the locking mechanism in greater detail in the locked position in which the stub shaft 56 is exerting a compressive force on the internal inside wall of rail 42 of module 40 to draw the two adjacent rails into tight locking alignment.

In operation, the rotor 58 is turned by a suitable tool, such as an allen wrench 62, which activates a camming unit 60 contained within housing 52. The camming unit provides a prescribed motion to drive arm 54 when moved from the unlocked stored position within the housing 52. Initially the stub shaft is raised out of its stored position into the guide opening in the adjacent keyway 44 and then laterally over the narrow section of the keyway. When fully positioned over the narrow section of the keyway, the shaft is drawn downward against the inside surface 43 of the rail on each side of the keyway to apply a high latching force to draw the two rails tightly together. The rotor/cam mechanism for the prescribed motion is readily commercially available in the art.

In order to avoid unwanted metal to metal contact between abutting modules, resilient seal means 64 are positioned between rails 32 and 42 which also aids in providing a tight seal when the modules are locked together. Compressible hollow seals 45 are mounted around the panel receiving opening. At panel closure, of the panel compresses the seals as shown in FIG. 4 to prevent air being conducted inside the unit from escaping around the panel.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A locking mechanism for an air handling duct which includes a plurality of interconnected modules which together made up said duct, said locking mechanism comprising a male retainer means contained on a frame member which surrounds an insulated panel of a first module, said male retainer having a locking arm adapted to be moved from an unlocked position to a locked position, and a complementary female retainer contained on a frame member which surrounds an insulated panel of a second module, said female retainer being in the form of an elongated keyway designed to receive and hold said arm in a locked position, and means to move said arm from an unlocked position to a locked position when said male and female retainer means are in alignment for locking said modules together, wherein said frame members, are in the form of rectangular metal tubes.

2. The locking mechanism of claim 1 in which the means to move the locking arm is located on the outside of the module.

3. The locking mechanism of claim 2 in which the movement of the locking arm is effected by a hand tool.

4. The locking mechanism of claim 1 in which the male retainer means is located within the frame member of said first module.

5. The locking mechanism of claim 1 in which the motion of the locking arm is controlled by a rotor/cam mechanism which is actuated by a hand tool.

6. The locking mechanism of claim 1 in which the modules are separated by resilient seal means.

* * * * *